United States Patent
Disch et al.

(10) Patent No.: US 7,441,532 B2
(45) Date of Patent: Oct. 28, 2008

(54) FOUR-STROKE INTERNAL COMBUSTION ENGINE HAVING REDUCED NOISE EMISSIONS

(75) Inventors: Tom Disch, Brookfield, WI (US); Jeffrey P. Feist, Pewaukee, WI (US); Kayne Kowis, Hartland, WI (US); Elliot Matel, Milwaukee, WI (US); Robert J. Rose, Hartford, WI (US); Marvin Vissers, Oak Creek, WI (US); Jeffrey H. Whitmore, Shorewood, WI (US); Geoffrey P. Zabrowski, Racine, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 93 days.

(21) Appl. No.: 11/354,633

(22) Filed: Feb. 15, 2006

(65) Prior Publication Data

US 2007/0186894 A1 Aug. 16, 2007

(51) Int. Cl.
*F02M 77/04* (2006.01)
*F02M 77/11* (2006.01)
(52) U.S. Cl. .................................. 123/198 E
(58) Field of Classification Search .......... 123/198 E, 123/43; 181/204
See application file for complete search history.

(56) References Cited

U.S. PATENT DOCUMENTS

| | | | |
|---|---|---|---|
| 2,789,662 A | 4/1957 | McMullen |
| 2,862,572 A | 12/1958 | Amlott |
| 2,865,467 A | 12/1958 | McMichael |
| 3,039,254 A | 6/1962 | Thornburgh |
| 4,425,145 A | 1/1984 | Reese |
| 4,790,864 A | 12/1988 | Kostun |
| 5,059,221 A | 10/1991 | McWilliam |
| 5,134,977 A | 8/1992 | Bagger et al. |

(Continued)

FOREIGN PATENT DOCUMENTS

EP 1600623 11/2005

(Continued)

OTHER PUBLICATIONS

Briggs & Stratton Illustrated Parts List Model Series 10D900, pp. 5, 9, and 10, Mar. 30, 2005.

(Continued)

*Primary Examiner*—Thomas N Moulis
(74) *Attorney, Agent, or Firm*—Michael Best & Friedrich LLP

(57) ABSTRACT

The present invention provides a four-stroke internal combustion engine having reduced noise emissions. The engine includes a filter element having substantially flat inlet and outlet sides, a first housing portion, and a second housing portion coupled to the first housing portion. The first and second housing portions define an air chamber in which the filter element is supported. The second housing portion includes an interior surface, at least one protrusion to space the inlet side of the filter element from the interior surface, and an air passageway. The outlet of the air passageway is positioned adjacent the interior surface to deliver air to the air chamber between the interior surface and the inlet side of the filter element. A ratio of the volume of the air chamber to the length of the air passageway is between about 5 in$^2$ and about 20 in$^2$.

8 Claims, 11 Drawing Sheets

U.S. PATENT DOCUMENTS

| | | | |
|---|---|---|---|
| 5,164,550 A | | 11/1992 | Beidl et al. |
| 5,522,355 A | | 6/1996 | Uhl |
| 5,564,513 A | * | 10/1996 | Wible et al. ............... 180/68.3 |
| 5,582,146 A | * | 12/1996 | Linsbauer et al. ........ 123/198 E |
| 5,609,658 A | | 3/1997 | Takemura et al. |
| 5,632,243 A | | 5/1997 | Buchholz |
| 5,706,777 A | * | 1/1998 | Schlessmann et al. .... 123/198 E |
| 5,819,696 A | * | 10/1998 | Wada .................... 123/198 E |
| 5,865,863 A | | 2/1999 | DeSousa et al. |
| 5,918,576 A | * | 7/1999 | Ohoka et al. ............ 123/198 E |
| 5,996,734 A | | 12/1999 | Lam et al. |
| 6,478,018 B2 | | 11/2002 | Fedorowicz et al. |
| 6,513,481 B2 | * | 2/2003 | Stass et al. ............... 123/198 E |
| 6,881,238 B2 | * | 4/2005 | Marchart et al. .............. 55/495 |
| 6,923,841 B2 | * | 8/2005 | Chen .......................... 55/497 |
| 7,032,573 B2 | * | 4/2006 | Ardisana ................... 123/434 |
| 7,069,893 B2 | * | 7/2006 | Cusumano et al. ..... 123/184.21 |
| 7,093,589 B2 | * | 8/2006 | Sorersen et al. .......... 123/559.1 |
| 7,097,694 B1 | * | 8/2006 | Jaroszczyk et al. ............. 96/17 |

FOREIGN PATENT DOCUMENTS

| | | |
|---|---|---|
| GB | 2274408 | 7/1994 |
| WO | 9822703 | 5/1998 |

OTHER PUBLICATIONS

Briggs & Stratton Illustrated Parts List Model Series 050000, pp. 6, 12, and 13, Apr. 22, 2005.

Briggs & Stratton Illustrated Parts List Model Series 129700, pp. 4, 13, and 14, Dec. 14, 2005.

Figs. 1-3 illustrate an air cleaner from a Honda Model EU1000i generator commercially available at least as early as 2001.

Figs. 4-6 illustrate an air cleaner from a Honda Model EU2000i generator commercially available at least as early as 2001.

Figs. 7-9 illustrate an air cleaner from a Yanmar Model GA180 engine commercially available at least as early as 2005.

Figs. 10-11 illustrate an air cleaner from a Tecumseh engine commercially available at least as early as 1979.

Figs. 12-13 illustrate an air cleaner from a Mitsubishi Heavy Industries Model No. 245432 engine commercially available at least as early as May 18, 2005.

Figs. 14-15 illustrate an air cleaner cover from a Briggs & Stratton Model 13 engine commercially available at least as early as Aug. 14, 1992.

Figs. 16-17 illustrate an air cleaner cover from a Briggs & Stratton Model 9U and Model 11U engine commercially available at least as early as Nov. 1, 1983.

* cited by examiner

FOUR-STROKE INTERNAL COMBUSTION ENGINE HAVING REDUCED NOISE EMISSIONS

FIELD OF THE INVENTION

This invention relates generally to engines, and more particularly to air cleaner assemblies for engines.

BACKGROUND OF THE INVENTION

Small utility engines such as those utilized in walk-behind mowers or pressure washers commonly incorporate an air cleaner assembly for filtering an airflow for use by the engine. Such air cleaner assemblies commonly include a cover, a base, and a filter element positioned between the cover and base. When a cartridge-style filter element is used, the air cleaner assembly commonly includes an air inlet, and an air outlet oriented substantially normal to the air inlet, such that air flowing from the air inlet toward the air outlet passes radially inwardly through the annular filter element before reaching the air outlet. When a flat-panel filter element is used, the air cleaner may include an air inlet, and an air outlet oriented substantially parallel to the air inlet, such that air flowing from the air inlet toward the air outlet passes through the filter element without being significantly redirected.

SUMMARY OF THE INVENTION

The present invention provides a four-stroke internal combustion engine having reduced noise emissions. The engine includes an engine housing including a cylinder, a piston adapted for reciprocating movement in the cylinder, an intake valve selectively movable to allow intake air into the cylinder, and an exhaust valve selectively movable to allow exhaust gases to exit the cylinder. The engine also includes a filter element having a substantially flat inlet side and a substantially flat outlet side, a first housing portion, and a second housing portion coupled to the first housing portion. The first housing portion and second housing portion define an air chamber in which the filter element is supported. The second housing portion includes an interior surface, at least one protrusion extending from the interior surface to space the inlet side of the filter element from the interior surface, and an air passageway including an inlet and an outlet. The outlet is positioned adjacent the interior surface to deliver air to the air chamber between the interior surface and the inlet side of the filter element. The air passageway defines a length dimension and the air chamber defines a volume. A ratio of the volume of the air chamber to the length dimension of the air passageway is between about 5 in$^2$ and about 20 in$^2$.

Other features and aspects of the invention will become apparent by consideration of the following detailed description and accompanying drawings.

BRIEF DESCRIPTION OF THE DRAWINGS

In the drawings, wherein like reference numerals indicate like parts.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
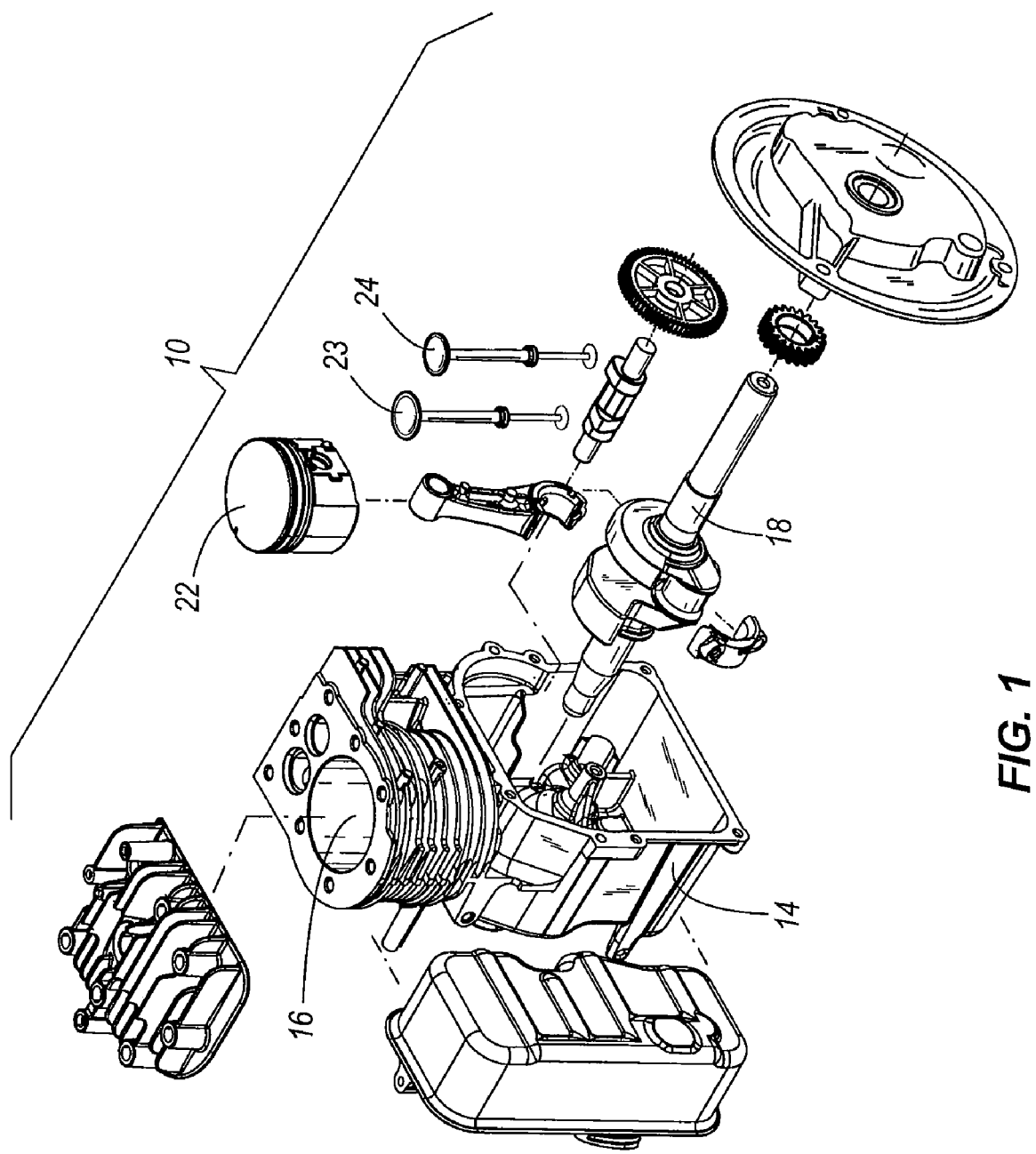
FIG. 1 is an exploded perspective view of a portion of a four-stroke internal combustion engine of the present invention.

FIG. 1 illustrates a small, air-cooled, four-stroke internal combustion engine 10. The engine 10 may be configured with a power output as low as about 1 hp and as high as about 35 hp to operate engine-driven outdoor power equipment (e.g., lawn mowers, lawn tractors, snow throwers, pressure washers, weed trimmers, etc.). As shown in FIG. 1, the engine 10 includes a housing 14 having a cylinder 16. A crankshaft 18 is rotatably supported in the housing 14, and a piston 22 is coupled to the crankshaft 18 for reciprocating motion in the cylinder 16. The engine 10 also includes an intake valve 23 that is selectively movable to allow intake air into the cylinder 16, and an exhaust valve 24 that is selectively movable to allow exhaust gases to exit the cylinder 16. Although the engine 10 illustrated in FIG. 1 includes a side-valve configuration, the engine 10 may also include an overhead valve configuration. In addition, although the illustrated engine 10 is configured as a single-cylinder vertical shaft engine 10, the engine 10 may also be configured as a two-cylinder engine or as a horizontal shaft engine.

Figure 2:
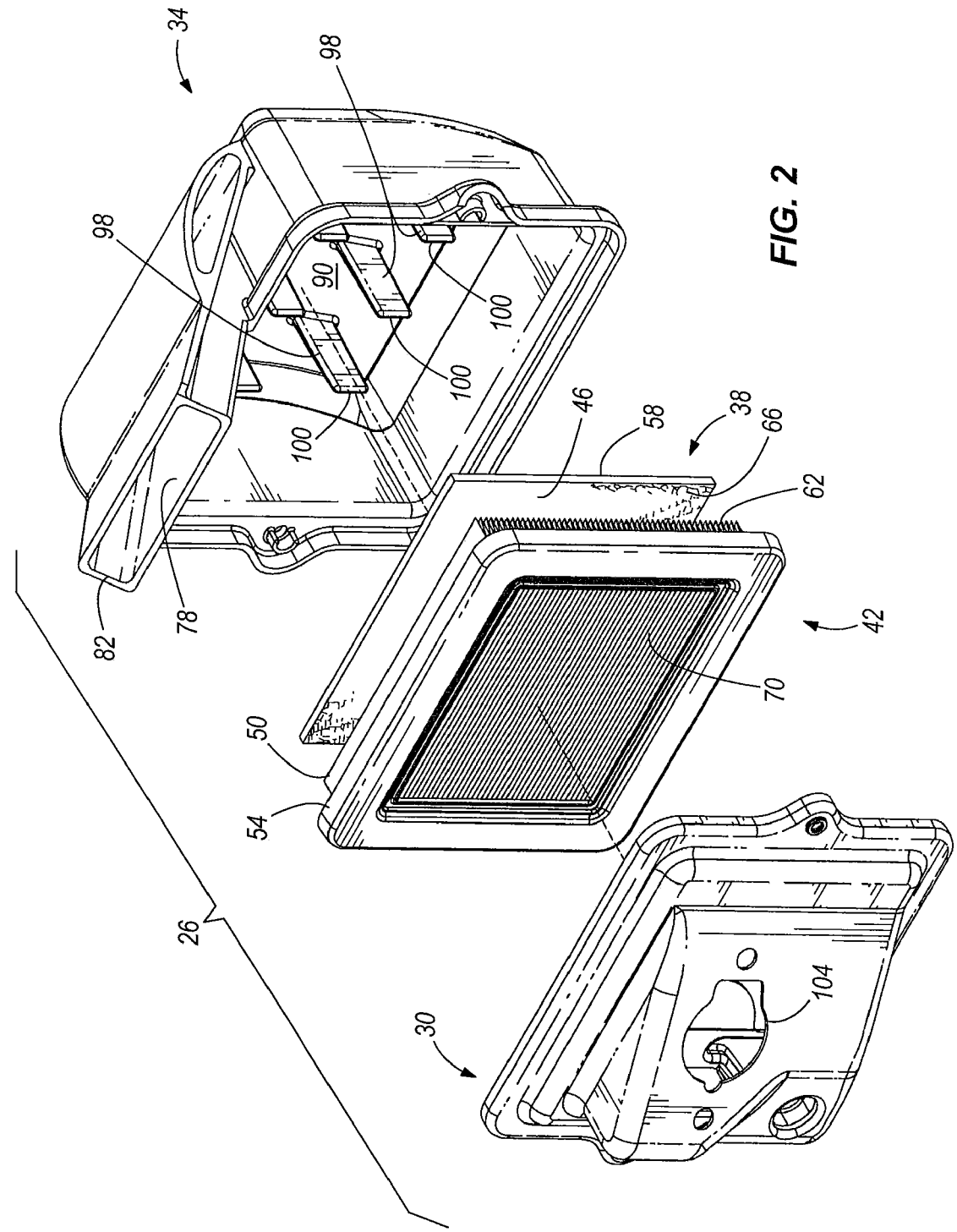
FIG. 2 is an exploded perspective view of a first construction of an air cleaner assembly for use with the four-stroke internal combustion engine of the present invention, illustrating filter elements positioned between a cover and a base.

FIG. 2 illustrates a first construction of an air cleaner assembly 26 that may be utilized with the engine 10 of FIG. 1 to provide a filtered airflow to the engine 10. With reference to FIG. 2, the air cleaner assembly 26 includes a base 30, a cover 34, a first filter element 38 positioned between the base 30 and the cover 34, and a second filter element 42 positioned between the base 30 and the cover 34. The base 30 may be coupled to the housing 14 by an intake manifold or an intake pipe (not shown) to support the air cleaner assembly 26, and the cover 34 may be coupled to the base 30 using conventional fasteners (not shown) to secure the filter elements 38, 42 between the base 30 and the cover 34.

With continued reference to FIG. 2, the first filter element 38 is configured as a "pre-filter" including an open-cell foam block or sheet 46, while the second filter element 42 is configured as a flat-panel filter element including an air-permeable paper membrane 50 coupled to an elastomeric or rubber base 54. In an alternate configuration, the second filter element 42 may include an open-cell foam block.

The open-cell foam sheet 46 is configured to trap larger-sized particulates and other foreign matter, while the membrane 50 is configured to trap smaller-sized particulates and other foreign matter entrained in an airflow passing through the foam sheet 46 and membrane 50. As shown in FIG. 2, the membrane 50 has a pleated shape to expose a larger total surface area of the membrane 50 to the airflow passing through the membrane 50, as opposed to a substantially flat or planar membrane shape. However, the respective filter elements 46, 50 may generally define substantially planar or flat inlet sides 58, 62 and substantially planar or flat outlet sides 66, 70.

Figure 3:
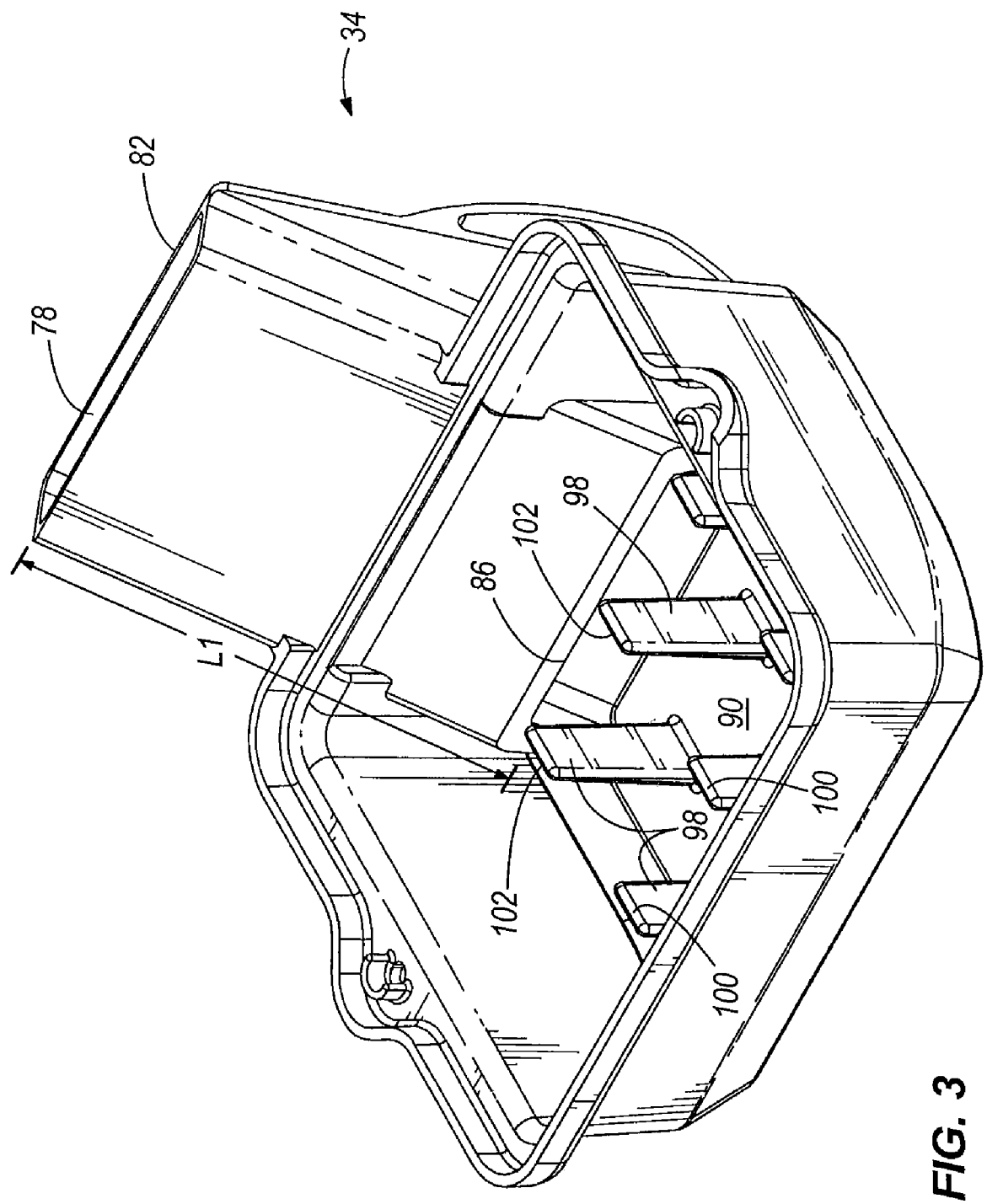
FIG. 3 is a perspective view of the cover of the air cleaner assembly of FIG. 2, illustrating an interior surface of the cover.
Figure 4:
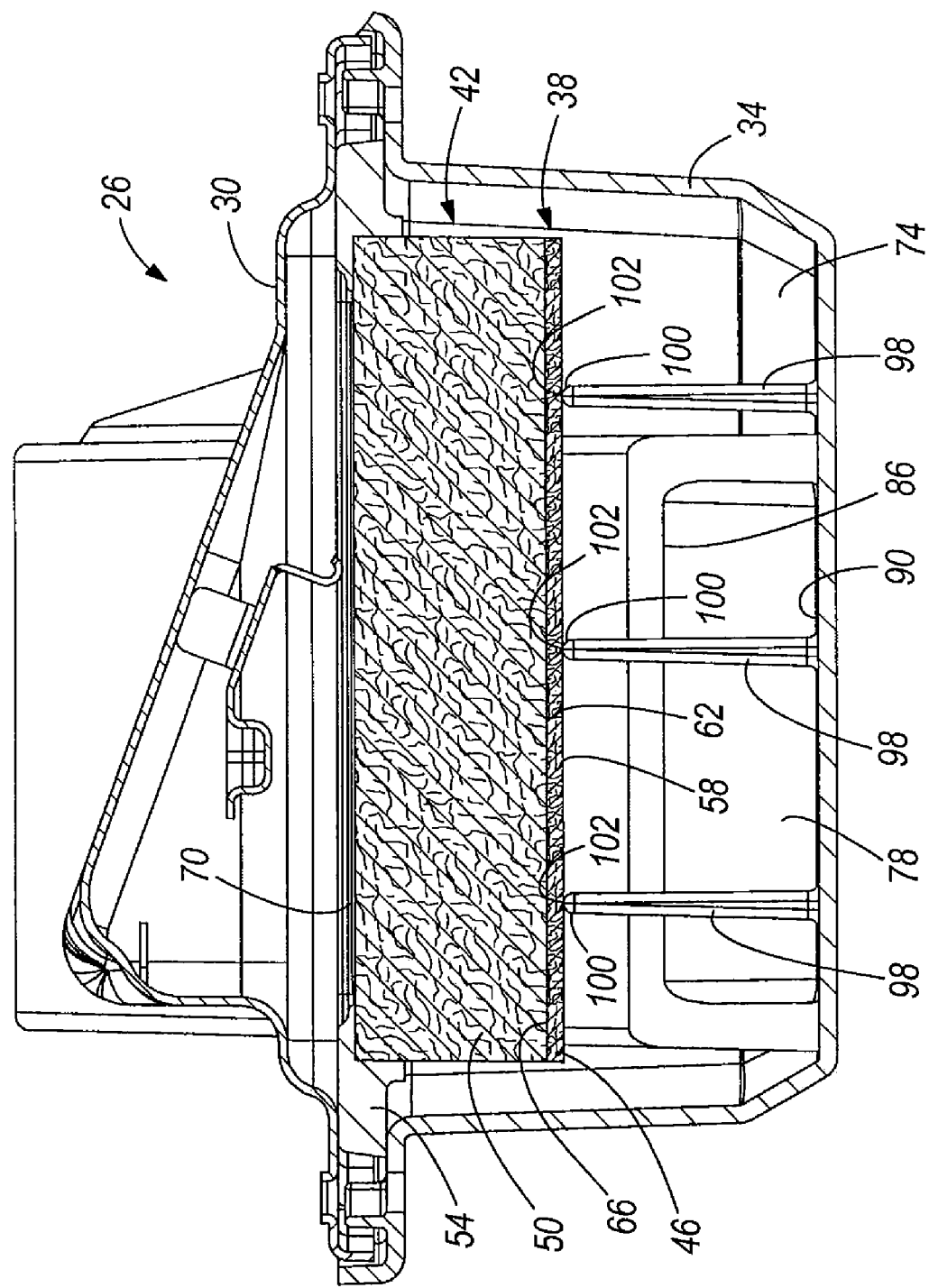
FIG. 4 is an assembled, cross-sectional view of the air cleaner assembly of FIG. 2.

With reference to FIG. 4, the base 30 and cover 34 define an air chamber 74 in which the filter elements 38, 42 are supported. Air is communicated from outside the cover 34 into the air chamber 74 via an air passageway 78 formed in the cover 34 (see also FIGS. 2 and 3). The air passageway 78 includes an air inlet 82 and an air outlet 86 positioned adjacent an interior surface 90 of the cover 34. The cover 34 includes a plurality of protrusions extending from the interior surface 90. The illustrated protrusions are configured as projections 98 upstanding from the interior surface 90. The projections 98 each include a substantially arcuate or curved top edge 100 defining an apex 102.

With reference to FIG. 4, the projections 98 engage the inlet side 58 of the filter element 38 to space the inlet side 58 of the filter element 38 from the interior surface 90 of the cover 34. Particularly, the projections 98 engage the inlet side 58 of the filter element 38 along the respective apices 102 substantially in "line contact." In other words, the respective apices 102 of the projections 98 contact the inlet side 58 of the filter element 38 substantially along a "line," or along a substantially narrow area segment defined on the inlet side 58 of the filter element 38. In alternate constructions of the air cleaner assembly 26 not utilizing the foam sheet 46 as a pre-filter, the projections 98 may contact the inlet side 62 of the filter element 42.

During operation of the engine 10, an airflow is drawn through the air cleaner assembly 26, through the intake manifold, and into the cylinder 16 for combustion. Specifically, the airflow is initially drawn through the air passageway 78 and into the air chamber 74 in a direction substantially parallel with the inlet side 58 of the filter element 38. Since the projections 98 engage the inlet side 58 of the filter element 38 along the respective apices 102 substantially in line contact, the amount of "blocked" area on the inlet side 58 of the filter element 38 that is not exposed to the airflow is reduced. As a result, more of the inlet side 58 of the filter element 38 may be exposed to the airflow in the air chamber 74 for filtering, thereby increasing the overall airflow through the filter elements 38, 42 and increasing the usable life of the filter elements 38, 42. Subsequently, downstream of the filter elements 38, 42, the filtered airflow passes through an opening 104 in the base 30 (see FIG. 2) through which the filtered airflow is communicated to the cylinder 16 via the intake manifold or pipe.

Figure 5:
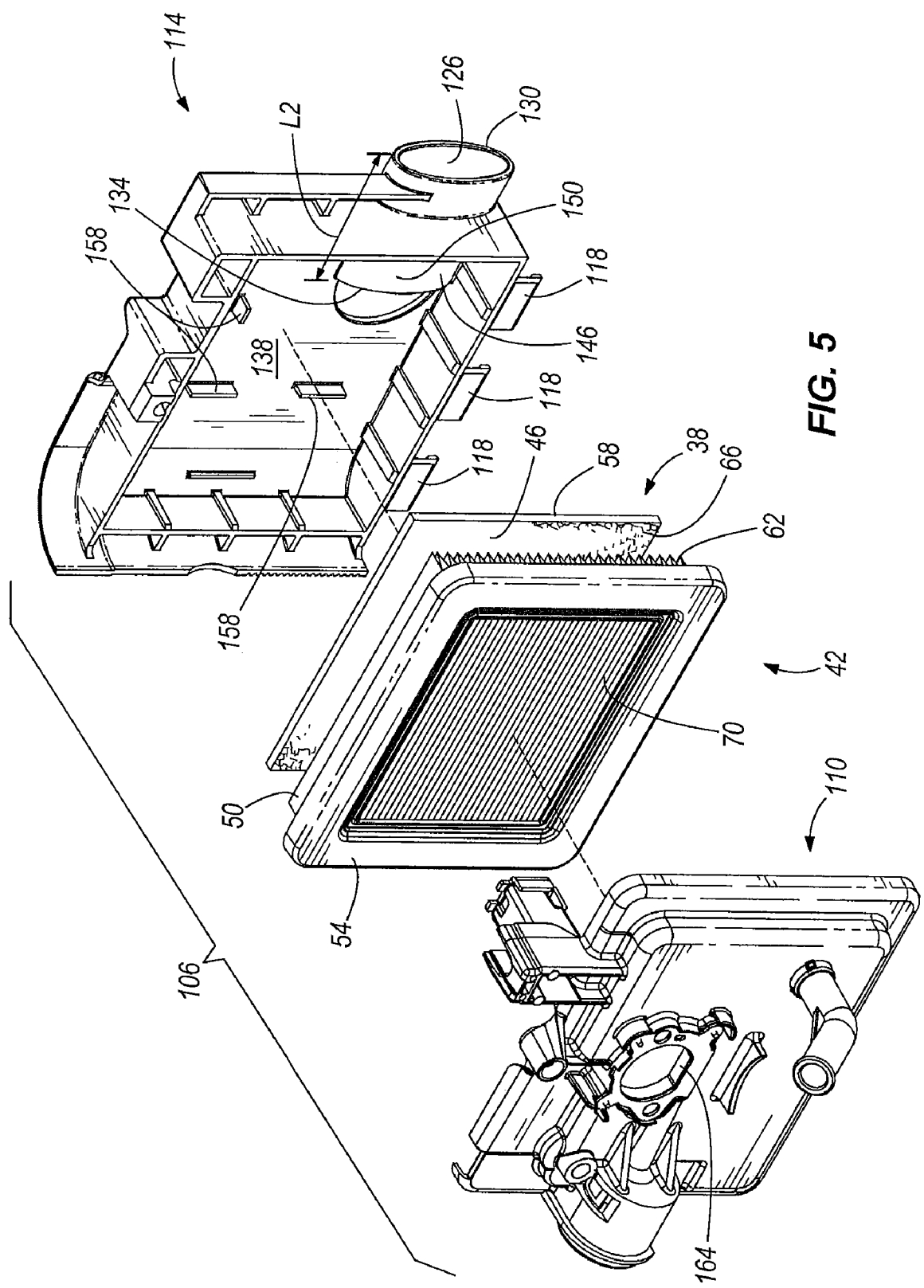
FIG. 5 is an exploded perspective view of a second construction of an air cleaner assembly for use with the four-stroke internal combustion engine of the present invention, illustrating filter elements positioned between a cover and a base.

FIG. 5 illustrates a second construction of an air cleaner assembly 106. Like the air cleaner assembly 26 of FIGS. 2-4, the air cleaner assembly 106 may be utilized with the engine 10 to provide a filtered airflow to the engine 10. The air cleaner assembly 106 includes a base 110, a cover 114, the first filter element 38 positioned between the base 110 and the cover 114, and the second filter element 42 positioned between the base 110 and the cover 114. As shown in FIG. 5, the filter elements 38, 42 are substantially similar to the filter elements 38, 42 of FIGS. 2-4, and will not be described again in detail. The base 110 may be coupled to the engine housing 14 via an intake manifold or an intake pipe (not shown) to support the air cleaner assembly 106, and the cover 114 may be coupled to the base 110 using a combination of conventional fasteners (not shown) and connecting structure 118, 120 integrally formed with the cover 114 and base 110 to secure the filter elements 38, 42 between the base 110 and the cover 114 (see FIG. 7).

Figure 6:
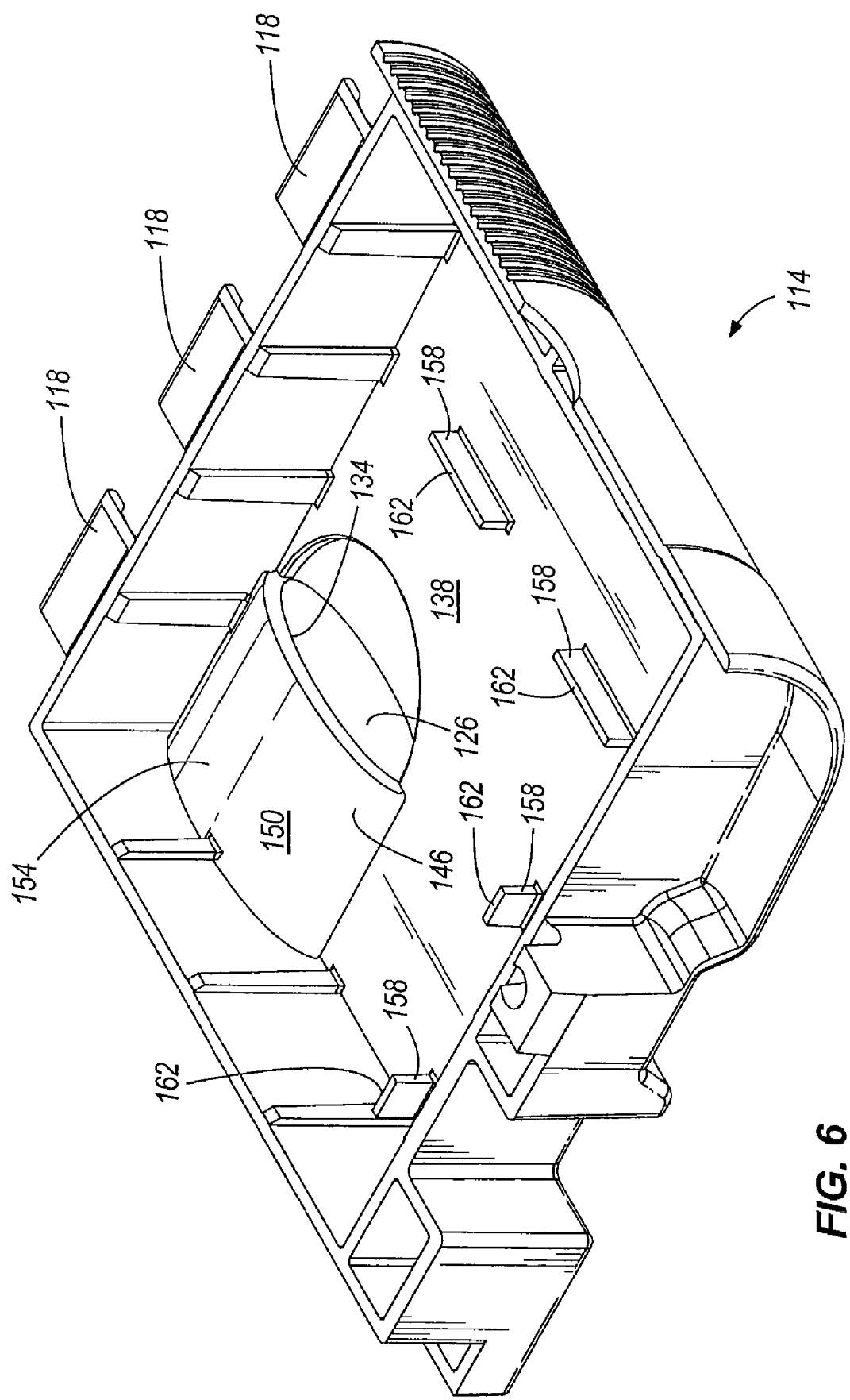
FIG. 6 is a perspective view of the cover of the air cleaner assembly of FIG. 5, illustrating an interior surface of the cover.
Figure 7:
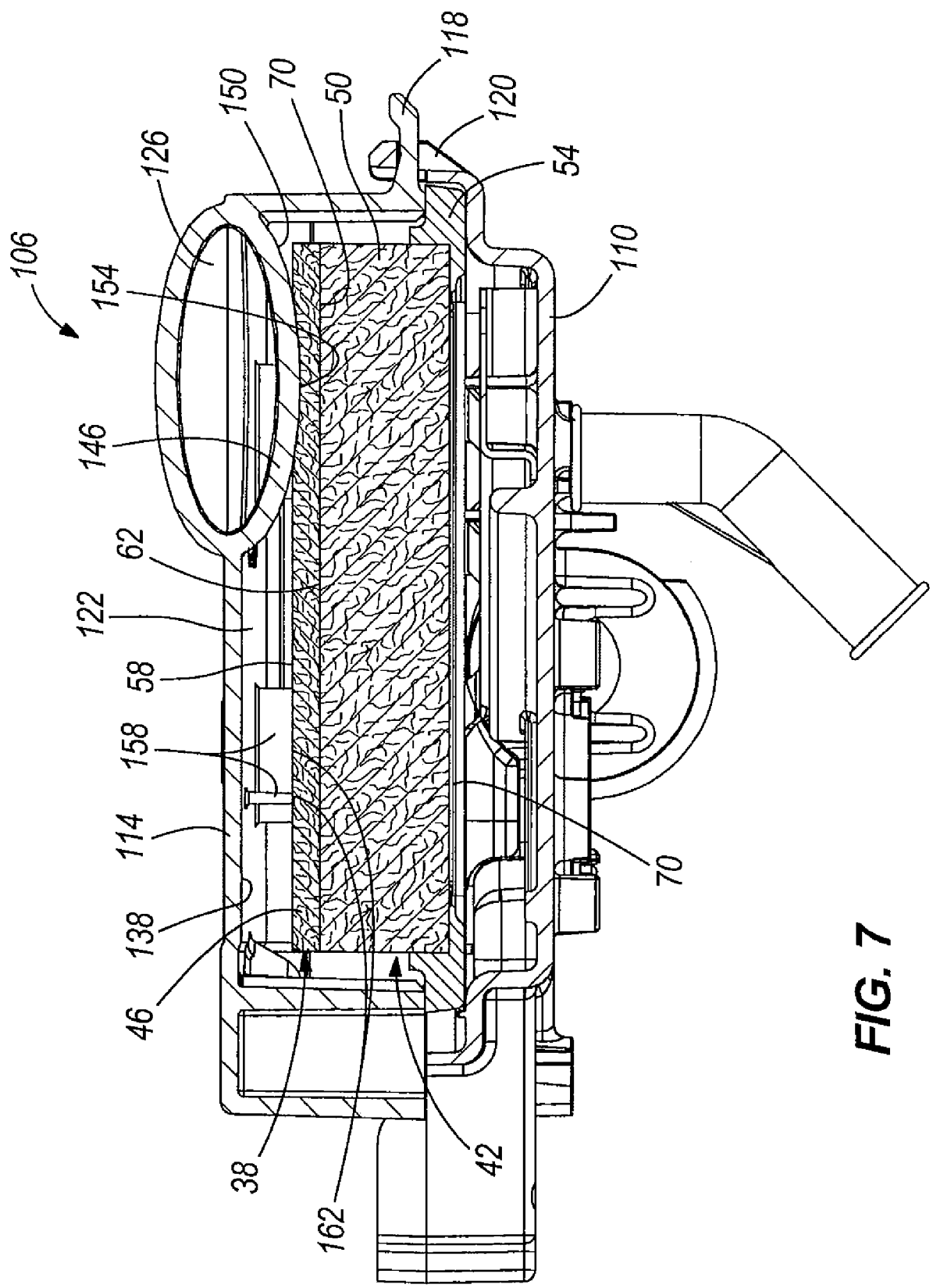
FIG. 7 is an assembled, cross-sectional view of the air cleaner assembly of FIG. 5.

With reference to FIG. 7, the base 110 and cover 114 define an air chamber 122 in which the filter elements 38, 42 are supported. Air is communicated from outside the cover 114 into the air chamber 122 via an air passageway 126 formed in the cover 114 (see FIGS. 5 and 6). The air passageway 126 includes an air inlet 130 and an air outlet 134 positioned adjacent an interior surface 138 of the cover 114. The illustrated air inlet 130 is shaped as an ellipse (see FIG. 5), however, other shapes may be utilized.

With reference to FIGS. 5-7, the cover 114 includes a plurality of protrusions extending from the interior surface 138. At least one of the protrusions is configured as a wall 146 at least partially defining the air passageway 126. The wall 146 includes an arcuate or curved outer surface 150 engaging the inlet side 58 of the filter element 38 to space the inlet side 58 of the filter element 38 from the interior surface 138 of the cover 114. Particularly, the arcuate or curved outer surface 150 of the wall 146 defines an apex 154 along which the inlet side 58 of the filter element 38 is engaged substantially in line contact (see FIG. 7). In other words, like the respective apices 102 of the projections 98 of FIGS. 2-4, the apex 154 of the curved outer surface 150 of the wall 146 contacts the inlet side 58 of the filter element 38 substantially along a "line," or substantially along a substantially narrow area segment defined on the inlet side 58 of the filter element 38.

As shown in FIGS. 5 and 6, other protrusions on the cover 114 are configured as projections 158 upstanding from the interior surface 138 of the cover 114. The projections 158 engage the inlet side 58 of the filter element 38 to space the inlet side 58 of the filter element 38 from the interior surface 138 of the cover 114 (see FIG. 7). Particularly, the projections 158 engage the inlet side 58 of the filter element 38 along respective apices 162 substantially in line contact. Although the respective apices 162 of the projections 158 may not be arcuate or curved, the apices 162 of the projections 158 engage the inlet side 58 of the filter element 38 along a substantially narrow area segment defined on the inlet side 58 of the filter element 38. In alternate constructions of the air cleaner assembly 106 not utilizing the foam sheet 46 as a pre-filter, the projections 158 and the curved outer surface 150 of the wall 146 may contact the inlet side 62 of the filter element 42.

During operation of the engine 10, an airflow is drawn through the air cleaner assembly 106, through the intake manifold, and into the cylinder 16 for combustion. Specifically, the airflow is initially drawn through the air passageway 126 and into the air chamber 122 in a direction substantially parallel with the inlet side 58 of the filter element 38. Since the curved outer surface 150 of the wall 146 engages the inlet side 58 of the filter element 38 along the apex 154 substantially in line contact, the amount of "blocked" area on the inlet side 58 of the filter element 38 that is not exposed to the airflow is reduced. As a result, more of the inlet side 58 of the filter element 38 may be exposed to the airflow in the air chamber 122 for filtering, thereby increasing the overall airflow through the filter elements 38, 42 and increasing the usable life of the filter elements 38, 42. Subsequently, downstream of the filter elements 38, 42, the filtered airflow passes through an opening 164 in the base 110 (see FIG. 5) through which the filtered airflow is communicated to the cylinder 16 via the intake manifold or pipe.

Figure 8:
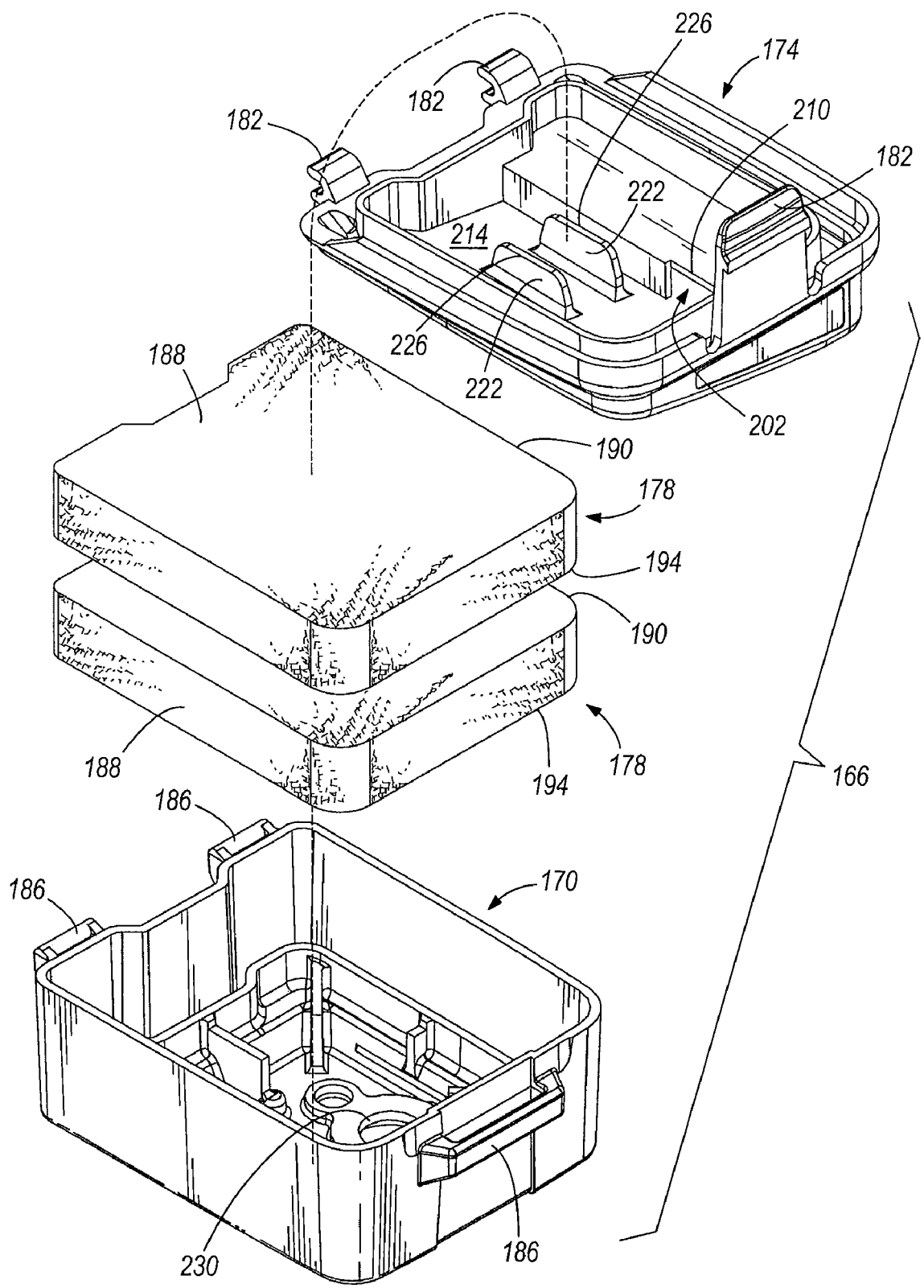
FIG. 8 is an exploded perspective view of a third construction of an air cleaner assembly for use with the four-stroke internal combustion engine of the present invention, illustrating filter elements positioned between a cover and a base.

With reference to FIG. 8, a third construction of an air cleaner assembly 166 is shown. Like the air cleaner assembly 26 of FIGS. 2-4, and the air cleaner assembly 106 of FIGS. 5-7, the air cleaner assembly 166 may be utilized with the engine 10 to provide a filtered airflow to the engine 10. The air cleaner assembly 166 includes a base 170, a cover 174, and dual filter elements 178 positioned between the base 170 and the cover 174. The base 170 may be coupled to the engine housing 14 via the intake manifold or intake pipe (not shown) to support the air cleaner assembly 166, and the cover 174 may be coupled to the base 170 using connecting structure 182, 186 integrally formed with the cover 174 and base 170 to secure the filter elements 178 between the base 170 and the cover 174.

With continued reference to FIG. 8, the illustrated filter elements 178 are configured as open-cell foam blocks 188. Each of the foam blocks 188 generally defines a substantially planar or flat inlet side 190 and a substantially planar or flat outlet side 194. In an alternate configuration, a single thick filter element may be utilized rather than the thinner, dual filter elements 178. In another alternate configuration, at least one of the filter elements 178 may be configured as a flat-panel filter element having an air-permeable paper membrane, like the filter elements 42 of the air cleaner assemblies 26, 106 of FIGS. 2-4 and FIGS. 5-7. In yet another alternate configuration, one of the filter elements 178 may be configured as a thin foam element, or "pre-filter," in combination with the membrane.

Figure 9:
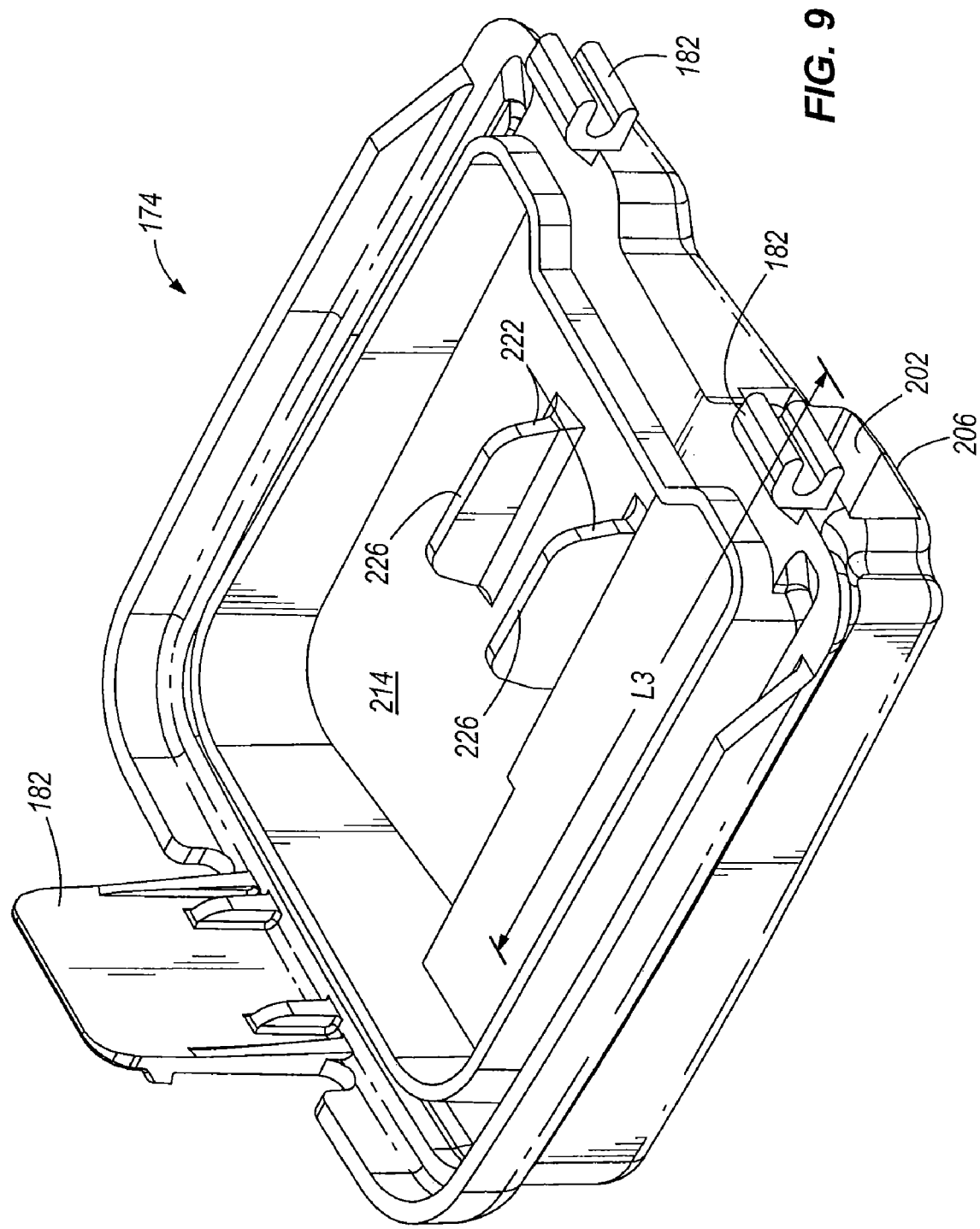
FIG. 9 is a perspective view of the cover of the air cleaner assembly of FIG. 8, illustrating an interior surface of the cover.
Figure 10:
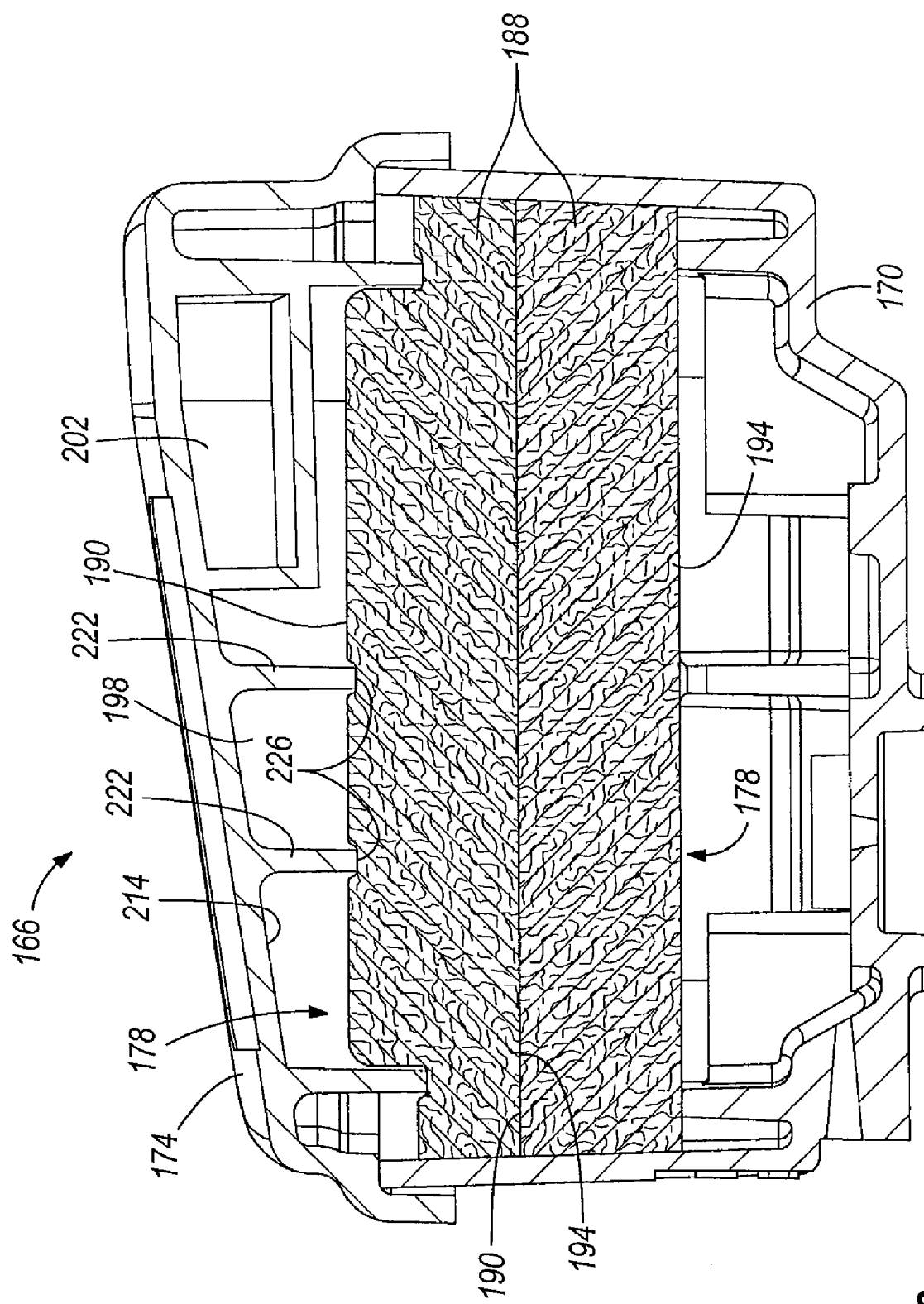
FIG. 10 is an assembled, cross-sectional view of the air cleaner assembly of FIG. 8.

With reference to FIG. 10, the base 170 and cover 174 define an air chamber 198 in which the filter elements 178 are supported. Air is communicated from outside the cover 174 into the air chamber 198 via an air passageway 202 formed in the cover 174 (see also FIGS. 8 and 9). The air passageway 202 includes an air inlet 206 and an air outlet 210 positioned adjacent an interior surface 214 of the cover 174. The cover 174 includes a plurality of protrusions extending from the interior surface 214. The protrusions are configured as projections 222 upstanding from the interior surface 214 of the cover 174. The projections 222 engage the inlet side 190 of the adjacent filter element 178 to space the inlet side 190 of the filter element 178 from the interior surface 214 of the cover 174. Particularly, the projections 222 engage the inlet side 190 of the filter element 178 along respective apices 226 substantially in line contact. Although the respective apices 226 of the projections 222 may not be arcuate or curved, the apices 226 of the projections 222 engage the inlet side 190 of the filter element 178 along a substantially narrow area segment defined on the inlet side 190 of the filter element 178.

During operation of the engine 10, an airflow is drawn through the air cleaner assembly 166 and through the intake manifold for combustion. Specifically, the airflow is initially drawn through the air passageway 202 and into the air chamber 198 in a direction substantially parallel with the inlet side 190 of the filter element 178. Since the projections 222 engage the inlet side 190 of the filter element 178 along the respective apices 226 substantially in line contact, the amount of "blocked" area on the inlet side 190 of the filter element 178 that is not exposed to the airflow is reduced. As a result, more of the inlet side 190 of the filter element 178 may be exposed to the airflow in the air chamber 198 for filtering, thereby increasing the overall airflow through the filter elements 178 and increasing the usable life of the filter elements 178. Subsequently, downstream of the filter elements 178, the filtered airflow passes through an opening 230 in the base 170 (see FIG. 8) through which the filtered airflow is communicated to the cylinder 16 via the intake manifold or pipe.

One or more of the air cleaner assemblies 26, 106, 166 may include air passageways 78, 126, 202 and air chambers 74, 122, 198 sized to reduce the noise emissions of the engine 10. In some embodiments of the air cleaner assemblies 26, 106, 166, the noise emissions of the engine 10 may be reduced by up to about 5 dbA. Particularly, with reference to the air cleaner assembly 26 of FIGS. 2-4, the volume of the air chamber 74 and the length of the air passageway 78 may be sized to attenuate specific frequencies (e.g., between about 300 Hz and about 700 Hz) associated with intake airflow noise in the air cleaner assembly 26. In one embodiment of the air cleaner assembly 26, the air passageway 78 may include a length dimension L1 (see FIG. 3), such that a ratio of the volume of the air chamber 74 to the length dimension L1 is between about 5 in$^2$ and about 20 in$^2$ to attenuate frequencies between about 300 Hz and about 700 Hz associated with intake airflow noise. Particularly, in the illustrated construction of the air cleaner assembly 26, the ratio of the volume of the air chamber 74 to the length dimension L1 is about 13 in$^2$.

Likewise, with reference to the air cleaner assembly 106 of FIGS. 5-7, the volume of the air chamber 122 and the length of the air passageway 126 may be sized to attenuate specific frequencies (e.g., between about 300 Hz and about 700 Hz) associated with intake airflow noise in the air cleaner assembly 106. In one embodiment of the air cleaner assembly 106, the air passageway 126 may include a length dimension L2 (see FIG. 5), such that a ratio of the volume of the air chamber 122 to the length dimension L2 is between about 5 in$^2$ and about 20 in$^2$ to attenuate frequencies between about 300 Hz and about 700 Hz associated with intake airflow noise. Particularly, in the illustrated construction of the air cleaner assembly 106, the ratio of the volume of the air chamber 122 to the length dimension L2 is about 13 in$^2$.

Further, with reference to the air cleaner assembly 166 of FIGS. 8-10, the volume of the air chamber 198 and the length of the air passageway 202 may be sized to attenuate specific frequencies (e.g., between about 300 Hz and about 700 Hz) associated with intake airflow noise in the air cleaner assembly 166. In one embodiment of the air cleaner assembly 166, the air passageway 202 may include an average length dimension L3 (see FIG. 9), such that a ratio of the volume of the air chamber 198 to the length dimension L3 is between about 5 in$^2$ and about 20 in$^2$ to attenuate frequencies between about 300 Hz and about 700 Hz associated with intake airflow noise. Particularly, in the illustrated construction of the air cleaner assembly 166, the ratio of the volume of the air chamber 198 to the length dimension L3 is about 6 in².

Figure 11:
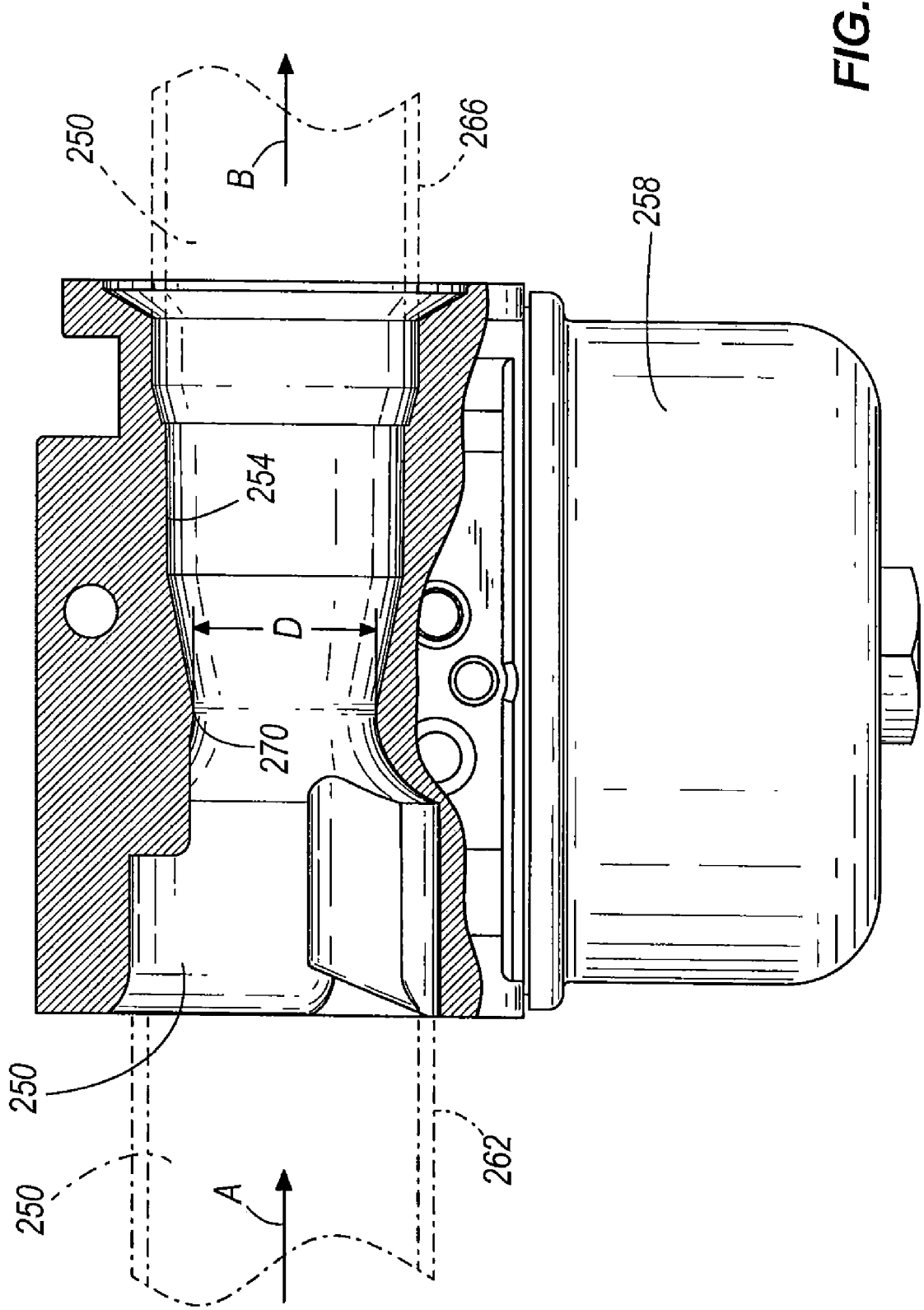
FIG. 11 is a partial cross-sectional view of a portion of an intake passageway of the four-stroke internal combustion engine of FIG. 1.

One or more of the air cleaner assemblies 26, 106, 166 may also include air passageways 78, 126, 202 sized with respect to an intake passageway 250 in the engine 10 so as to not restrict the flow of air or the flow of an air/fuel mixture through the intake passageway 250. FIG. 11 illustrates a portion of the intake passageway 250 through the engine 10. Specifically, the illustrated portion of the intake passageway 250 includes a venturi 254 formed in a carburetor 258, a conduit 262 directing an airflow (indicated by arrow "A") toward the venturi 254, and a conduit 266 directing an air/fuel mixture (indicated by arrow "B") away from the venturi 254. The conduit 262 may extend between any of the air cleaner assemblies 26, 106, 166 and the inlet of the venturi 254, while the conduit 266 may comprise an intake manifold or pipe extending between the outlet of the venturi 254 and an intake port (not shown) in the engine housing 14.

With continued reference to FIG. 11, the intake passageway 250 includes a restriction 270, having a diameter "D," formed in the venturi 254. The restriction 270 limits the amount of airflow or air/fuel mixture that the intake passageway 250 is capable of delivering to the intake port of the engine 10. The restriction 270 defines a cross-sectional area, proportional to diameter D, in a plane substantially normal to the direction of airflow (indicated by arrow A) through the venturi 254. With reference to FIG. 3, the air passageway 78 may define a cross-sectional area, in a plane substantially normal to the length dimension L1, at least twice as large as the cross-sectional area of the restriction 270 in the intake passageway 250. Likewise, with reference to FIG. 5, the air passageway 126 may define a cross-sectional area, in a plane substantially normal to the length dimension L2, at least twice as large as the cross-sectional area of the restriction 270 in the intake passageway 250. Further, with reference to FIG. 9, the air passageway 202 may define a cross-sectional area, in a plane substantially normal to the length dimension L3, at least twice as large as the cross-sectional area of the restriction 270 in the intake passageway 250.

In an alternative construction of the intake passageway 250 of the engine 10, the restriction 270 may be formed within a different portion of the intake passageway 250. For example, in a configuration of the engine 10 utilizing fuel injection, the restriction 270 may be formed within a throttle body.

Various features of the invention are set forth in the following claims.

What is claimed is:

1. A four-stroke internal combustion engine having reduced noise emissions, the engine comprising:
   an engine housing including a cylinder;
   a piston adapted for reciprocating movement in the cylinder;
   an intake valve selectively movable to allow intake air into the cylinder;
   an exhaust valve selectively movable to allow exhaust gases to exit the cylinder;
   a filter element having
      a substantially flat inlet side;
      a substantially flat outlet side;
   a first housing portion;
   a second housing portion coupled to the first housing portion, the first housing portion and second housing portion defining an air chamber in which the filter element is supported, the second housing portion including
      an interior surface;
      at least one protrusion extending from the interior surface to space the inlet side of the filter element from the interior surface; and
      an air passageway including an inlet and an outlet, the outlet positioned adjacent the interior surface to deliver air to the air chamber between the interior surface and the inlet side of the filter element;
   wherein the at least one protrusion includes a wall at least partially defining the air passageway, and wherein the wall includes a curved outer surface having an apex that engages the inlet side of the filter element substantially in line contact.

2. The engine of claim 1, wherein the at least one protrusion further includes a plurality of projections extending from the interior surface to engage the inlet side of the filter element substantially in line contact.

3. The engine of claim 1, wherein the at least one protrusion is integrally formed with the second housing portion.

4. The engine of claim 1, wherein the air enters the air chamber in a direction parallel to the inlet side of the filter element.

5. The engine of claim 1, wherein the inlet of the air passageway is shaped as an ellipse.

6. The engine of claim 1, wherein the filter element is a first filter element, and wherein the engine further includes a second filter element positioned adjacent the first filter element.

7. The engine of claim 6, wherein at least one of the first and second filter elements includes an open-cell foam pre-filter.

8. The engine of claim 1, further comprising an intake passageway extending between the first housing portion and the engine housing, wherein the intake passageway includes a restriction having a cross-sectional area in a plane normal to the direction of fluid flow through the intake passageway, and wherein the air passageway has a cross-sectional area in a plane normal to a length dimension of the air passageway that is at least twice as large as the cross-sectional area of the restriction.

* * * * *